United States Patent

[11] 3,581,103

| [72] | Inventor | Aarne Olavi Makela<br>Karhula, Finland |
|---|---|---|
| [21] | Appl. No. | 787,870 |
| [22] | Filed | Dec. 30, 1968 |
| [45] | Patented | May 25, 1971 |
| [73] | Assignee | A. Ahlstrom Osakeyhtio<br>Noormarkku, Finland |
| [32] | Priority | Jan. 3, 1968 |
| [33] | | Finland |
| [31] | | 13/68 |

[54] ARRANGEMENT FOR THE ADJUSTMENT OF THE POSITION OF MOVABLE MACHINE ELEMENTS
4 Claims, 3 Drawing Figs.

[52] U.S. Cl. .................................. 250/231, 250/215
[51] Int. Cl. .................................. G05b 13/02, G01d 5/34
[50] Field of Search .......................... 250/223, 222, 221, 231, 215, 237, 219 (RG), 219 (L), 219 (WD), 219 (LG); 143/115

[56] References Cited
UNITED STATES PATENTS

| 3,040,603 | 6/1962 | Benton | 250/231(X) |
| 3,093,778 | 6/1963 | Tidwell | 250/231(X) |
| 3,214,581 | 10/1965 | Coley | 250/223(X) |
| 3,238,374 | 3/1966 | Pfister | 250/223(X) |
| 3,322,961 | 5/1967 | Harrison et al. | 250/219 |

*Primary Examiner*—Walter Stolwein
*Attorney*—Albert M. Parker

ABSTRACT: The invention is particularly applicable for the adjustment of an edge trimming saw by remote control, wherein the number of positions into which the machine element is to be adjusted is small. There is described a nonlinear system comprising a coarse adjustment for transferring the element to the vicinity of the desired point at a high velocity and a fine adjustment to transfer the body at a low velocity toward its final position. The fine adjustment is effected by a photocell device and a toothed strip of opaque material.

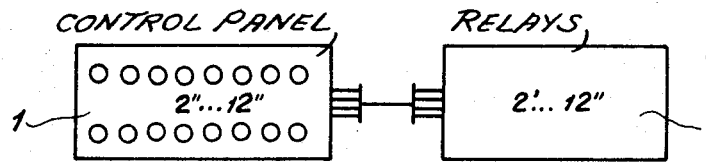
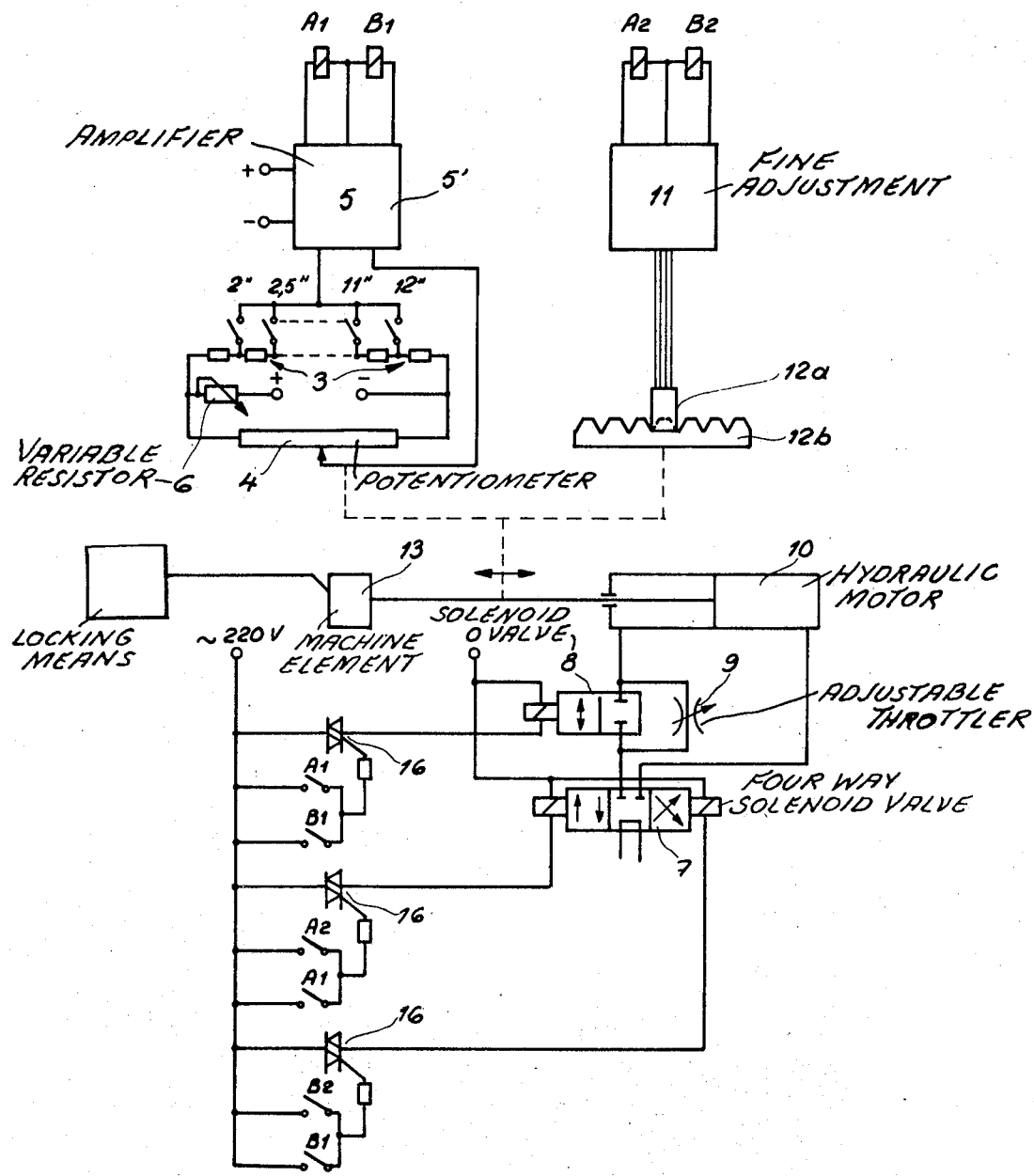
Fig. 1a.
Fig. 1

ARRANGEMENT FOR THE ADJUSTMENT OF THE POSITION OF MOVABLE MACHINE ELEMENTS

BACKGROUND OF THE INVENTION

1. Field of the Invention

The present invention relates to an arrangement for the adjustment of movable machine elements by pushbutton control, in which the adjustment is arranged to be effected in two stages.

2. Description of the Prior Art

One prior known control device for edge trimming saws is described in detail in the Swedish Pat. No. 195,458. The presently described arrangement has in comparison with the above-mentioned one inter alia the advantage that it can be utilized as such, even without a hydraulic positioner, for the moving of elements of considerable weight. In this way the system becomes a mechanically simple and economically attractive one.

In case the number of the positions into which the machine element is to be adjusted is relatively small (e.g., an edge trimming saw has 15 such positions), the analogical and digital position adjusting systems prior known in connection with numerous machine tools will prove too expensive.

SUMMARY OF THE INVENTION

When it is desired to convert a machine element for remote control, an arrangement is required by which the position of said machine element can be adjusted. The arrangement to be described presently was developed particularly for the adjustment of an edge trimming saw. It is, however, to be understood that said arrangement is not restricted exclusively for this purpose, as it is readily applicable for the adjustment of other machine elements as well. The adjustment of the position of a movable edge trimming saw by remote control to the desired trimming width is by virtue of this arrangement effected quickly and accurately by pushing a pushbutton.

The adjustment control system to be described is nonlinear. First of all there is a transfer to the vicinity of the desired point at a high velocity. After this the accurate adjustment is carried out at a low velocity. Although the velocity at this stage is very low, the total transfer time from one position to another will be short, as the transfer taking place at said low velocity is very short.

The arrangement according to the invention is characterized in that it comprises a coarse adjustment, in which the control element is arranged, on the basis of the polarity of the differential between a voltage derived from a voltage distributor and corresponding to actual position of the machine element, and a voltage derived from a potentiometer and corresponding to the set value, to decide in which direction the machine element is to be moved, and said voltage difference is arranged to be introduced to a (transistor) amplifier, the relay of which corresponding to the pertinent direction becomes active and actuates a transferring element to which the machine element to be adjusted is connected, whereby said element is quickly transferred to the vicinity of the set point, to the beginning of a so called "dead zone," and the relay become inactive whereat a corresponding relay of the fine adjustment becomes active and the body to be transferred continues at a low velocity toward its final position, into which it is locked by means of restrictors known per se.

BRIEF DESCRIPTION OF THE DRAWING

The arrangement is described more fully in the following, with reference to the accompanying drawing in which FIG. 1 is a schematic view of the adjustment device, and FIG. 1a is a diagrammatic showing of a control arrangement of the invention.

DESCRIPTION OF THE PREFERRED EMBODIMENTS

Figure 2:
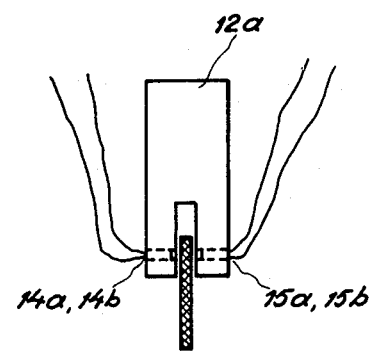
FIG. 2 shows a detail of the fine adjustment device.
Figure 2:
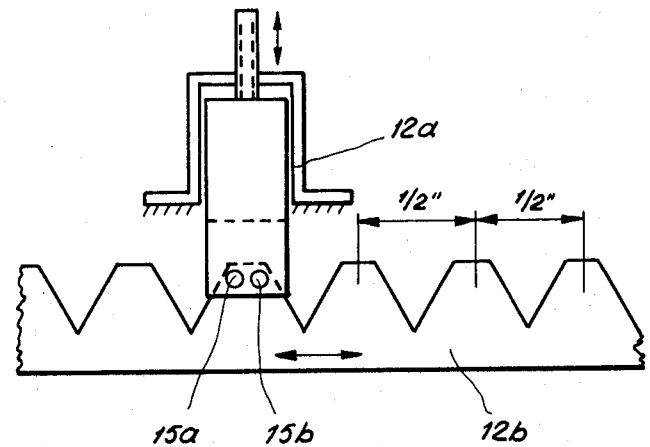

The preferred arrangement comprises a control device 1, which is positioned at the working site of the saw operator and which has pushbuttons corresponding to each pertinent sawing width, e.g. between 2 and 12 inches. Relays 2 corresponding to the pushbuttons (2 inch—12 inch) as well as a device 5 for coarse adjustment and a device 11 for fine adjustment are situated near the edge trimming saw. The coarse adjustment has a voltage distributor 3 made up of resistors and providing a voltage proportional to the desired position. The actual position of the movable machine element 13 is indicated by a voltage obtained from a potentiometer 4. The voltage differential is introduced into a transitor amplifier 5'. This amplifier is a zero indicator having relays $A_1$ and $B_1$ as its terminal stages. If the voltage (set value) indicative of the desired position differs from the voltage indicative of the actual position (actual value), one of the relays $A_1$ or $B_1$, depending on the direction of the differential becomes active. Essential in the arrangement is, however, that the amplifier has a certain "dead zone," adjustable by means of a resistor 6. In practice this means that each desired adjustment point of the movable machine element is situated at the center of an (adjustable) zone in which the relays $A_1$ and $B_1$ both are inactive. This zone represents an inaccuracy of the adjustment. This inaccuracy is eliminated by system for fine adjustment which advantageously can be arranged according to the following system. When active, the relay $A_1$ or $B_1$ connects, by means of a semiconductor element triac 16, used in lieu of a contactor, and in case a hydraulic motor for example a motor of the well-known type having a slidable piston is used as the transferring element, by means of a four-way solenoid valve 7, pressure to the hydraulic motor 10. If $A_1$ or $B_1$ is active, also a two-way solenoid valve 8 is active and the oil passes therethrough by an adjustable throttler 9. The transferring element, i.e., the hydraulic motor 10 quickly moves the movable element to the beginning of the "dead zone." Now the relay $A_1$ or $B_1$ that was active, becomes inactive and the solenoid valve 8 closes. The oil has now to pass through the restriction 9 whereby the velocity of the movable body drops to a small value. At the same time the adjustment of the body to its correct position is taken over by the fine adjustment device.

The fine adjustment device consists of a toothed strip 12b of a material impermeable by light. The strip is attached to the movable machine element and travels in the manner shown in the figure, in a slot provided in a photocell device 12a. The photocell device has two adjacent light transmitter/light receiver combinations 14a, 14b/15a, 15b, having relays $A_2$ and $B_2$ as their terminal stages. The photocell device 12a can by means of a screw be moved in the direction indicated by the two-headed arrows in the figure (in the vertical direction).

Accordingly, when either relay $A_1$ or $B_1$ of the coarse adjustment device becomes inactive, the corresponding relay ($A_2$ or respectively $B_2$) becomes active and the body is moved continuously at a slow velocity toward its final position, as the solenoid valve 7 is working, while the valve 8 is inactive. The relays $A_1$, $B_1$, $A_2$ and $B_2$ are arranged so that when $A_1$ or respectively $B_1$ becomes inactive, the beam of light from a light transmitter such as 14a reaches one of the light receivers such as 15a, whereby the corresponding one of the last-mentioned relays $A_2$ or $B_2$ becomes active, whereas a tooth of the tooth strip cuts off the other beam of light. The body to be moved, together with its tooth strip, now continues its travel until the tooth cuts off the first-mentioned beam of light also, whereby the relay becomes inactive, the solenoid valve 7 becomes inactive and the movable machine is locked in place. The tooth strip must be attached to the movable machine element so that when the movable element is in the correct position, the centerline of the tooth is at the middle of the two photocell devices (see FIG. 2). Depending upon the direction of movement, one of the relays $A_1$ or $B_1$ remains energized until the difference voltage introduced to the amplifier 5 (and corresponding to the difference between the desired position and the actual position) becomes so small that the energized relay is deenergized. The movable machine element is then near the position selected by the pushbutton.

The fine adjustment relay A is energized when the light receiver 15a receives light and the fine adjustment relay $B_2$ is similarly energized when the light receiver 15b receives light. Suppose, for example, that relay $A_1$, the pushbutton control being pressed, is energized and controls the movement of the movable element rapidly toward the desired point with the help of the semiconductor element 16, the four-way solenoid valve 7, the two-way solenoid valve 8 and the hydraulic motor 10. When the movable machine elements nears the desired position, the relay $A_1$ is deenergized. By this time a tooth of the toothed strip 12b already covers the light for the light receiver 15b, but on the contrary the light receiver 15a receives light and the relay $A_2$ controlled by receiver 15a is energized. When the relays $A_1$ and $B_1$ are deenergized, the fine adjustment device 11 is supplied with voltage and the relay $A_2$ or $B_2$ can be activated while being controlled by the corresponding light receiver. The contacts of the relays $A_1$ and $A_2$ controlling the four-way solenoid valve 7 through the semiconductor element 16 are connected in parallel. Thus deenergizing $A_1$ and energizing $A_2$ does not effect the flow direction of oil to the motor 10 and the motor and the movable element connected thereto continue their movement in the previous direction. However, the deenergizing of the relay $A_1$ causes the solenoid valve 8 to shut and the oil is forced to flow through the throttler 9, its speed falling to a very slow rate. The movement continues until the toothed strip cuts off also the light beam from the light receiver 15a. Then the relay $A_1$ is deenergized and the four-way solenoid valve 7 is returned by a spring to its rest position. The oil flow-way is now cut on both sides of the piston 10 which is thus fixed in its position (oil being practically incompressible).

The movement in opposite direction is carried out in the same way. For reverse movement the coarse adjustment relay $B_2$ and the light receiver 15b are active. Note that when the movable element is in its desired position the tooth of the toothed strip cuts off the light beam from both of the light receivers 15a and 15b as shown in FIG. 2.

The accuracy of the adjustment can be regulated by changing the width of the area (the tooth) covering the two photocells. This is effected by moving the photocell device vertically upward. Thereby the accuracy of the adjustment increases. On the other hand the velocity that can be used in the fine adjustment decreases as the accuracy of the adjustment increases, and the transfer time from one position to another increases. Thus the described device provides a very simple selection, merely by turning a screw, of the desired adjustment accuracy, and then, a suitable velocity can be selected by adjusting the restriction 9. (The distance at which the slow movement begins is selected by means of the adjustable resistor 6.)

The invention can be modified in many ways within the scope of the accompanying claims. Thus, for instance, the rectilinear movement can by means of a gear wheel and a gear rod be converted into a rotational movement, in which case a toothed disc must be substituted for the toothed strip.

The adjustment tolerance can be regulated alternatively by making the teeth of equal width and constructing the photocell device so that the distance between the photocells is adjustable.

I claim:

1. Apparatus for the adjustment of movable machine elements by pushbutton control comprising: a coarse adjustment circuit having a voltage distributor operatively connected both to a potentiometer supplying a voltage indicative of the position of a machine element to be adjusted and to means for supplying a selected voltage indicative of a desired position of said machine element for comparing said voltages and providing a voltage difference signal, an amplifier for receiving said voltage difference signal, said amplifier having a first pair of relays corresponding to opposite polarities of said voltage difference signal so that one of said relays is activated in accordance with the signal received; a transferring device connected to cooperate with whichever of said relays is activated to move said machine element quickly in one of two opposite directions to the vicinity of the desired position, and means establishing a dead zone when the machine element is in the vicinity of the desired position wherein both relays of said pair of relays become inactive; and light sensitive fine adjustment means having a further pair of relays each relay of said further pair corresponding to one relay of said first pair for actuating means for moving said machine element closer to the desired position at a relatively slow speed; and means for locking the machine element in place at its desired position.

2. Apparatus according to claim 1, said fine adjustment means comprising a photocell device having two spaced adjacent light transmitters and two spaced adjacent light receivers, a toothed strip secured to the machine element to move therewith, said strip being positioned between said transmitters and receivers, and spaced teeth of the strip being so positioned as to block off transmitted light from either or both of said receivers depending upon the position of said machine element, each of the two receivers corresponding to the one of relays of said further pair of relays for activation of the relay when the corresponding receiver receives transmitted light, said teeth being large enough to block off light to both said receivers, thereby making both relays of said further pair of relays inactive, said locking means being actuated when both said relays are inactive.

3. Apparatus according to claim 2 and including means for varying the extent of said dead zone by adjustment of the relationship of said toothed strip to said photocell device.

4. Apparatus according to claim 1 said fine adjustment means comprising a photocell device having two spaced adjacent light transmitters and two spaced adjacent light receivers, a toothed disc being coupled to said machine element to rotate in proportion to transverse movement of the machine element, said disc being positioned between transmitters and receivers, and spaced teeth of said disc being so positioned as to block off transmitted light from either or both of said receivers depending upon the position of said machine element, each of the two receivers corresponding to one of the relays of said further pair of relays for activation of the relay when the corresponding receiver receives transmitted light, said teeth being large enough to block off light to both said receivers thereby making both relays of said further pair of relays inactive, said locking means being actuated when both said relays are inactive.